(12) United States Patent  (10) Patent No.: US 8,222,401 B2
Sha et al.  (45) Date of Patent: Jul. 17, 2012

(54) METALLOCENYL PHTHALOCYANINE COMPOUNDS AND USE THEREOF

(75) Inventors: Chin Kang Sha, Hsinchu (TW); Cheng Fen Yang, Hsinchu (TW); Ping Chang Cheng, Hsinchu (TW); Ching Jung Chang, Hsinchu (TW); Kuang Fu Yen, Hsinchu (TW); An Wei Hong, Hsinchu (TW)

(73) Assignee: Orgchem Technologies Inc, Hsinchu (TW)

( * ) Notice: Subject to any disclaimer, the term of this patent is extended or adjusted under 35 U.S.C. 154(b) by 0 days.

(21) Appl. No.: 13/168,775

(22) Filed: Jun. 24, 2011

(65) Prior Publication Data

US 2011/0282052 A1  Nov. 17, 2011

Related U.S. Application Data

(62) Division of application No. 12/124,448, filed on May 21, 2008, now abandoned.

(51) Int. Cl.
*C09B 47/04* (2006.01)
(52) U.S. Cl. ....................................................... 540/140
(58) Field of Classification Search .................. 540/140
See application file for complete search history.

(56) References Cited

U.S. PATENT DOCUMENTS

| 6,399,768 B1 | 6/2002 | Wolleb et al. |
| 7,034,148 B2 | 4/2006 | Beyrich et al. |
| 2005/0250942 A1 | 11/2005 | Beyrich et al. |
| 2006/0088786 A1 | 4/2006 | Tamada et al. |

FOREIGN PATENT DOCUMENTS

| DE | 102007025996 | 1/2008 |
| JP | 2003-025725 | 1/2003 |
| JP | 2005-004877 | 1/2005 |

*Primary Examiner* — James O Wilson
*Assistant Examiner* — Brian McDowell
(74) *Attorney, Agent, or Firm* — Muncy, Geissler, Olds & Lowe, PLLC

(57) ABSTRACT

This invention relates to a novel metallocenyl phthalocyanine compound represented by the following general formula (I), in which at least one of the four benzene rings of phthalocyanine is connected with the organometallic complex group through a linker having one carbon atom. This invention also relates to the use of the phthalocyanine compounds in optical recording media.

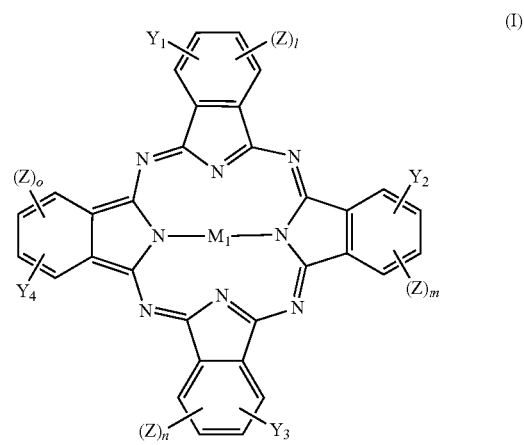

wherein, all symbols are defined in the specification.

1 Claim, No Drawings

METALLOCENYL PHTHALOCYANINE COMPOUNDS AND USE THEREOF

CROSS REFERENCE TO RELATED APPLICATIONS

This application is a Divisional of application Ser. No. 12/124,448, filed on 21 May 2008 now abandoned, and for which priority is claimed under 35 U.S.C. §120; and this application claims priority of Application No. 096103912 filed in Taiwan on 2 Feb. 2007 under 35 U.S.C. §119; the entire contents of all of which are hereby incorporated by reference.

TECHNICAL FIELD

This invention relates to novel metallocenyl phthalocyanine compounds and derivatives thereof, and their use for the recording layers of optical recording media.

BACKGROUND OF THE INVENTION

With the rapid growth of our digital world, the technology for optical storage is being highly developed. The advantages of an optical medium disk are that data are easily recorded on such a medium, it is suitable for enduring storage, and it has a modest cost. This recording data medium is now becoming an accepted way to store information because of its large storage capacity.

The field of this invention is directed to dyes used in the recording layer on a writable optical disk, because such dyes exhibit varied optical properties upon irradiation. There are optical disks of several kinds as follows: (1) Write Once, Read Many (WORM); (2) Read Only Memory (ROM); (3) Erasable Direct Read after Write (EDRW). In a disk of WORM type, the recording material uses mainly dyes capable of absorbing light in the near infrared region (NIR region), as described by M. Emmelius in Angewandte Chemie, No. 11, pages 1475-1502 (1989). It is based primarily on the principle that laser irradiation of the dyes can produce the changes in absorption necessary to record information in digital form in such recording materials by means of physical (for example, by sublimation or diffusion) or chemical (for example, photochromy, isomerization or thermal decomposition of the dye) changes.

The optical recording medium disks for storage information in the market are DVD-R as 8x~16x, and CD-R as 32x~52x. When a CD-R operates at a large writing speed, the jitter value at short pits or lands can be decreased with a relatively thin recording layer, but this thin layer requires an increased writing power at a given writing speed, which once again limits the maximum achievable writing speed at a given laser point.

Recording materials are, however, unable to meet fully the increased requirements at great writing speeds. In particular, it is found that the optimum thickness of the recording layer varies depending on the range of writing speed. Whereas, at a small writing speed, an unsatisfactorily small contrast is generally the critical parameter that can be improved with a relative thick layer, at a large writing speed, the critical parameter is generally excessive jitter at short pits or lands (in particular L3T), which can be decreased with a relatively thin recording layer. A thin layer requires, undesirably, an increased writing power at a given writing speed, which once again limits the maximum achievable writing speed at a given laser point.

The recording layer to be used must meet demanding requirements such as a large index of refraction and small absorption at the laser wavelength, a large contrast of the written pits, a uniformity of the pit with varied pit length, great light stability in daylight and under weak laser radiation (reading) while concurrently maintaining a great sensitivity under intense laser radiation (writing), great long-term stability, small noise, high resolution and—a particularly important aspect—a minute systematic and random deviation ('jitter') of pit length from a prescribed value at an optimum writing power.

Among various dyes used in the optical recording medium, phthalocyanine is a widely used material and remains the most important. Phthalocyanine has the advantages of excellent light and environmental stability. The disadvantages of phthalocyanine are (1) lack of light sensitivity, (2) poor solubility, (3) a high temperature required for recording, and (4) a small reflectivity. For these reasons other substituents must be incorporated into the phthalocyanine molecular structure. U.S. Pat. Nos. 5,270,463 and 5,280,114 disclosed phthalocyanines involving bulky substituents, for example, a branched alkoxy group and halide at the same time to decrease the temperature needed for recording and to increase the solubility of the phthalocyanine dye. Although the phthalocyanines disclosed in this patent can decrease the decomposition temperature, and possess excellent writing decomposability, increased solubility in the solvent and increased reflectivity, these phthalocyanines also result in an increased Block Error Rate (BLER) when a greater writing speed is required; thus its writing property is also diminished.

EP-A 600427 disclosed a dye for a recording layer in an optical recording medium that is based on phthalocyanines with a few additives, for example, a combustion aid such as ferrocenyl derivatives, or an antiknocking agent to improve the heat decomposability and recording property, but it is still unsatisfactory for recycling because of the solubility difference between the phthalocyanines and the additives.

WO 97/23354 disclosed a method to solve the problem of the disparate solubility by binding the metallocenyl and the phthalocyanines, but its recording property is still unsatisfactory.

WO 00/09522, WO 03/068865 and WO 02/083796 disclosed binding the metallocenyl and the phthalocyanines via a bridging unit E, where E is composed of a chain of at least two atoms or atom groups selected from the group consisting of —$CH_2$—, —C(C=O)—, —CH($C_{1-4}$ alkyl)-, —C($C_{1-4}$ alkyl)$_2$-, —NH—, —S—, and —O—, to produce metallocenyl phthalocyanines that are capable of use in recording layers of recording media with high-speed writing.

In summary from the above-mentioned prior arts, it is generally considered that metallocenyl phthalocyanines prepared by binding phthalocyanines and metallocene together through use of an atomic group are beneficial for use in a recording layer of a high-speed rewritable recording medium and can resolve the problems encountered in the recovering/recycling process. Moreover, their solubility in solvents commonly used in this field is increased and their decomposability and rewriting stability are greatly improved.

Currently, only altering the specificity of the phthalocyanine structures themselves can not achieve a great sensitivity ratio (C/N, carrier to noise), optimal recording power and recording properties (such as small jitter) required in recording media. Also, from relevant papers and patent publications, it is pointed out that the compound obtained on bonding phthalocyanines and metallocene can greatly improve its sensitivity and recording properties when it is used as a dye in a recording layer for recording media, but the preparation of metallocenyl phthalocyanines requires multiple steps so that its cost of production becomes increased. Moreover, phthalocyanine compounds are slightly soluble in non-polar solvents commonly used in preparing recording material; thus when the phthalocyanine compounds are used in a solution to prepare the recording layer, the phthalocyanine compounds aggregate slowly and in turn precipitate after use for a period of time. A phthalocyanine compound having resolved the above problems and a simple process to prepare the same are therefore needed.

SUMMARY OF THE INVENTION

Under the above circumstances, the present inventors have conducted investigation of the structure of phthalocyanine compounds and their synthesis and found that novel metallocenyl phthalocyanine compounds/mixtures obtained on connecting phthalocyanine with metallocene through a linker containing one carbon atom through a Friedel-Crafts reaction exhibit excellent recording sensitivity and small jitter, and are thus suitable for use in high-speed rewritable recording media. Moreover, these novel metallocenyl phthalocyanine compounds/mixtures can be prepared with a simple process so that their production cost can be moderate. Especially, because the linker connecting phthalocyanine with metallocene contains only one carbon atom, the solubility in non-polar solvents is satisfactory, so resolving the problems of aggregation and precipitation.

The invention relates to metallocenyl phthalocyanine compounds and their mixtures that have satisfactory solubility (>6 mass %) in solvents, that can be prepared with a simple process, and that are suitable for use in recording layers of optical recording media.

In one aspect, this invention relates to novel metallocenyl phthalocyanine compounds represented with formula (I) that are suitable for use in high-speed rewritable recording media:

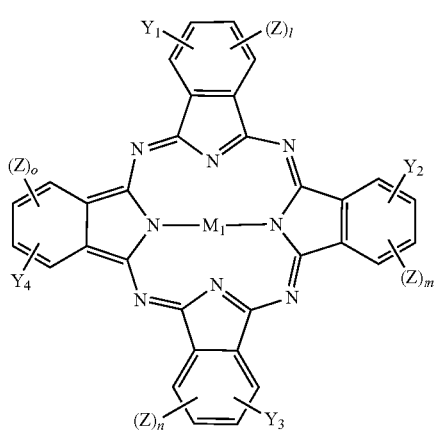

wherein,
$M_1$ represents two hydrogen atoms, a divalent metal, a trivalent metal having one ligand, or a tetravalent metal having two ligands;
$Y_1$, $Y_2$, $Y_3$, $Y_4$ each independently represents groups of —O—$R_1$, —S—$R_1$, or —N$R_1R_2$;
$R_1$ and $R_2$ each independently represents a hydrogen atom; a $C_1$-$C_{10}$ straight-chain, branched, or cyclic alkyl; a $C_2$-$C_{10}$ straight-chain, branched, or cyclic alkenyl; or a $C_2$-$C_{10}$ straight-chain, branched, or cyclic alkynyl;

Z represents a group of the following formula:

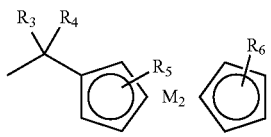

in which $R_3$ and $R_4$ each independently represents a hydrogen atom, a $C_1$-$C_4$ alkyl, or a $C_2$-$C_4$ alkenyl;
$R_5$ and $R_6$ each independently represents a hydrogen atom, a halogen atom, a nitro group, a $C_1$-$C_4$ alkyl, a $C_1$-$C_4$ alkoxy, a $C_1$-$C_4$ alkylamino, a di($C_1$-$C_4$alkyl)amino, or a diarylphosphine group;
$M_2$ is selected from an atom consisting of Fe(II), Co(II) and Ni(II);
wherein l, m, n, o each independently represents 0, 1 or 2, and l+m+n+o is between 1 and 8.

The metallocenyl phthalocyanine compounds of this invention (sometimes referred to "the present metallocenyl phthalocyanine compounds" hereinafter) can be in a mixture without isolation. Thus the compound represented by the above formula (I) includes those in a purified form and in a mixture form without isolation.

This invention also relates to a process for preparing the present metallocenyl phthalocyanine compounds and to their use in a recording layer of an optical recording medium.

DETAILED DESCRIPTION

This invention relates to novel compounds of formula (I),

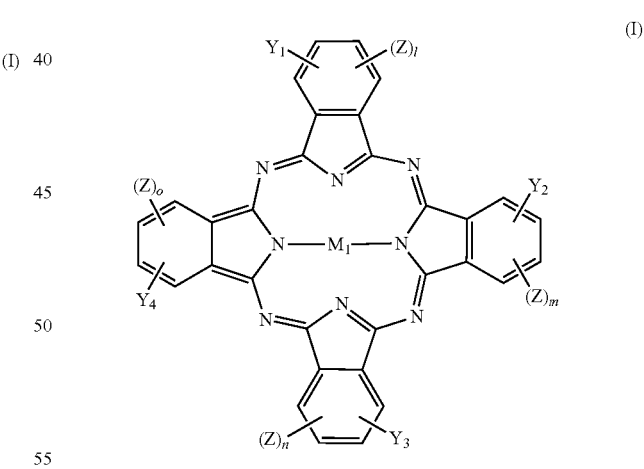

wherein
$M_1$ represents two hydrogen atoms, a divalent metal, a trivalent metal having one ligand, or a tetravalent metal having two ligands;
$Y_1$, $Y_2$, $Y_3$, $Y_4$ each independently represents a group —O—$R_1$, —S—$R_1$, or —N$R_1R_2$;
$R_1$ and $R_2$ each independently represents a hydrogen atom; a $C_1$-$C_{10}$ straight-chain, branched, or cyclic alkyl; a $C_2$-$C_{10}$ straight-chain, branched, or cyclic alkenyl; or a $C_2$-$C_{10}$ straight-chain, branched, or cyclic alkynyl;

Z represents a group of formula:

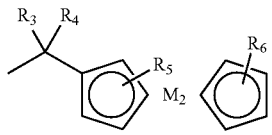

in which $R_3$ and $R_4$ each independently represents a hydrogen atom, a $C_1$-$C_4$ alkyl, or a $C_2$-$C_4$ alkenyl;

$R_5$ and $R_6$ each independently represents a hydrogen atom, a halogen atom, a nitro group, a $C_1$-$C_4$ alkyl, a $C_1$-$C_4$ alkoxy, a $C_1$-$C_4$ alkylamino, a di($C_1$-$C_4$alkyl)amino, or a diarylphosphine group;

$M_2$ is selected from atoms consisting of Fe(II), Co(II), and Ni(II);

wherein l, m, n, o each independently represents 0, 1 or 2, and l+m+n+o is between 1 and 8.

In the metallocenyl phthalocyanine compounds represented by formulae (I), when $M_1$ represents two hydrogen atoms, it signifies that these two hydrogen atoms each bond to the N atom in the N-containing heterocyclic ring.

The divalent metals represented by $M_1$ are, for example, Cu (II), Zn (II), Fe (II), Ni (II), Ru (II), Mn (II), Pd (II), Pb (II), or Co (II).

The trivalent metals represented by $M_1$ are the metals with one coordination site, for example, Al—Cl, Al—Br, Al—I, Ga—Cl, Ga—Br, Ga—I, In—Cl, In—Br, In—I, Ti—Cl, Ti—Br, Ti—I, Fe—Cl, Ru—Cl, Mn(OH), or Al(OH).

The tetravalent metals represented by $M_1$ are metals with two coordination sites, for example, $CrCl_2$, $SiCl_2$, $SiBr_2$, $SiI_2$, $ZrCl_2$, $GeCl_2$, $GeBr_2$, $GeI_2$, $SnCl_2$, $SnBr_2$, $SnI_2$, $TiCl_2$, $TiBr_2$, $TiI_2$, $Si(OH)_2$, $Ge(OH)_2$, $Zr(OH)_2$, $Mn(OH)_2$, or $Sn(OH)_2$.

The saturated, branched or cyclic kind of $C_1$–$C_{10}$ unsubstituted or substituted alkyl represented by $R_1$ and $R_2$ is, for example, methyl, ethyl, propyl, isopropyl, n-butyl, n-pentyl, n-hexyl, isohexyl, heptyl, octyl, nonanyl, decanyl, isobutyl, sec-butyl, tert-butyl, isopentyl, neopentyl, 1,2-dimethylpropyl, 1,1-dimethylbutyl, 2,2-dimethylbutyl, 2-methylpentyl, 3-methylpentyl, 4-methylpentyl, 1,3-dimethylbutyl, 1-isopropylpropyl, 1,2-dimethylbutyl, 2-methylhexyl, 3-methylhexyl, 4-methylhexyl, 5-methylhexyl, 1,2-dimethylpentyl, 1,3-dimethylpentyl, 1,4-dimethylpentyl, 2,3-dimethylpentyl, 2,4-dimethylpentyl, 2,3-dimethyl-2-pentyl, 2,4-dimethyl-2-pentyl, 3,3-dimethyl-2-pentyl, 3,4-dimethyl-2-pentyl, 4,4-dimethyl-2-pentyl, 2,2-dimethyl-3-pentyl, 2,3-dimethyl-3-pentyl, 2,4-dimethyl-3-pentyl, 2-methylheptyl, 3-methylheptyl, 4-methylheptyl, 2,2-dimethylheptyl, 2,3-diethylhexyl, 2,4-dimethylhexyl, 2,5-dimtheylhexyl, 3,5-dimethylhexyl, 2,2,3-trimethylpentyl, 2,2,4-trimethylpentyl, 2,3,4-trimethyl-2-pentyl, 2,4,4-trimethyl-2-pentyl, 2,2,4-trimethyl-3-pentyl, 2,3,4-trimethyl-3-pentyl, 2,2-dimethylheptyl, 2,4-dimethylheptyl, 2,5-dimethylheptyl, 3,5-dimethylheptyl, 2,6-dimethyl-4-heptyl, 2-methyl-1-isopropylpropyl, 1-ethyl-3-methylbutyl, 3-methyl-1-isopropylbutyl, 2-methyl-1-isopropylbutyl, 1-sec-butyl-2-methylpropyl, 2-ethylhexyl, cyclopentyl, cyclohexyl, 2-methylcyclopentyl, 1-methylcyclopentyl, cycloheptyl, 1-methylcyclohexyl, 2-methylhexyl, 4-methylcyclohexyl, 2,4-dimethylcyclopentyl, 2,6-dimethylcyclopentyl, 2-ethylcyclopentyl, cyclooctyl, 2-methylcycloheptyl, cyclononanyl and the like.

$R_1$ and $R_2$ can each be, independently of one another, a $C_{1-10}$ alkyl or cycloalkyl group substituted with halogen, for example, 2-chloroethyl, 3-bromopropyl, 2,2,3,3-tetrafluoropropyl, 1,1,1,3,3,3-hexafluoro-2-propyl, 2-chlorocyclopentyl, 2-chlorocycloheptyl and the like. $R_1$ and $R_2$ can each be, independently of one another, an unsaturated $C_1$-$C_{10}$ alkyl substituted with an alkoxy, for example, 2-methoxylethyl, 2-ethoxylethyl, 2-butoxylethyl, 1-ethoxy-2-propyl, 2-methoxylpropyl, 3-methoxylbutyl and the like; or an unsaturated $C_1$-$C_{10}$ alkyl substituted with di-alkyl amino group, for example, 2-dimethylaminoethyl, 2-diethylaminoethyl, 2-dipropylaminoethyl, 2-dibutylaminoethyl, 2-diethylaminopropyl and the like.

$R_1$ and $R_2$ can each be a $C_2$-$C_{10}$ straight-chain, branched or cyclic chain alkenyl, for instance, ethenyl, propenyl, isopropenyl, n-butenyl, isobutenyl, sec-butenyl, 1-methylpropenyl, n-pentenyl, neopentenyl, tert-pentenyl, 2-methylbutenyl, 3-methylbutenyl, 2-methylpentenyl, 3-methylpentenyl, 4-methylpentenyl, 2,3-dimethylbutenyl, n-hexenyl, heptenyl, 2-methylhexenyl, 3-methylhexenyl, 4-methylhexenyl, 5-methylhexenyl, 2,4-dimethylpentenyl, octenyl, 2-methylheptenyl, 6-methylheptenyl, cyclopentenyl, cyclohexenyl, cycloheptenyl, cyclooctenyl, cyclononanenyl, cyclodecanenyl and the like.

$R_1$ and $R_2$ can each be a $C_2$-$C_{10}$ straight-chain, branched or cyclic chain alkynyl, for instance, ethynyl, propynyl, isopropynyl, n-butynyl, isobutynyl, sec-butynyl, tert-butynyl, n-pentynyl, isopentynyl, neopentynyl, 1-methylbutynyl, 2-methylbutynyl, 1,1-dimethylpropynyl, 1,1-dimethylbutynyl, 2,2-dimethylbutynyl, n-hexynyl, isohexynyl, heptynyl, octynyl and the like.

Z is a group of formula

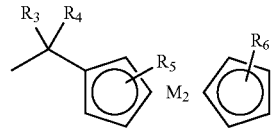

wherein $M_2$ is a divalent metal, for example, Fe (II), Co (II), and Ni (II); and $R_3$, $R_4$, $R_5$, and $R_6$ can each be a $C_1$-$C_4$ straight-chain alkyl, for example, methyl, ethyl, n-propyl, n-butyl, and the like, or a branched alkyl, for example, isopropyl, sec-butyl, tert-butyl, and the like.

$R_3$ and $R_4$ can each be a $C_2$-$C_4$ straight-chain alkenyl for example, ethenyl, n-propenyl, n-butenyl, and the like, or a branched alkenyl, for example, isopropenyl, isobutenyl, and the like.

The halogen represented by $R_5$ and $R_6$ is, for example, fluoro, chloro, bromo and iodo.

The $C_1$-$C_4$ alkoxy group represented by $R_5$ and $R_6$ is, for example, methoxy, ethoxy, propoxy, isopropoxy, n-butoxy, isobutoxy, sec-butoxy, 1-methoxypropyl, 2-methoxypropyl, 3-methoxypropyl, and the like.

The $C_1$-$C_4$ alkylamino or di-($C_1$-$C_4$)alkylamino group represented by $R_5$ and $R_6$ is, for example, methylamino, ethylamino, propylamino, isopropylamino, n-butylamino, sec-butylamino, isobutylamino, tert-butylamino, dimethylamino, diethylamino, dipropylamino, di-iso-propylamino, dibutylamino, di-sec-butylamino, di-iso-butylamino, di-tert-butylamino, and the like.

The diarylphosphine group represented by $R_5$ and $R_6$ is, for example, diphenylphosphine and substituted diphenylphosphines.

To illustrate directly the present invention, the carbons on the benzene rings in the metallocenyl phthalocyanine compounds represented by formula (I) are numbered as follows:

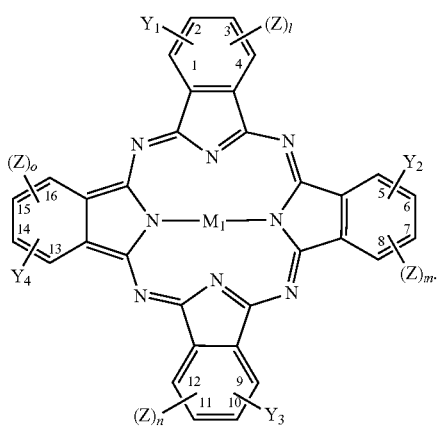
(I)

In formula (I), $Y_1$, $Y_2$, $Y_3$ and $Y_4$ can each be a substituent connected to the benzene ring, each being optionally substituted at any one of positions 1-16 available; $Y_1$, $Y_2$, $Y_3$ and $Y_4$ can be the same substituent or differ from each other.

Preferably, $Y_1$ is at position 1 or 4 of the benzene ring, $Y_2$ is at position 5 or 8, $Y_3$ is at position 9 or 12, and $Y_4$ is at position 13 or 16; for example, $Y_1$ is at position 1, $Y_2$ is at position 5, $Y_3$ is at position 9, and $Y_4$ is at position 13.

Moreover, substituent Z can be at any carbon at which no substituent $Y_1$, $Y_2$, $Y_3$ and $Y_4$ is present. The symbols l, m, n and o represent the number of the substituents of Z, each being 0, 1 or 2, and (l+m+n+o) is between 1 and 8.

The preferred embodiment of the present compound is the compound wherein $Y_1$, $Y_2$, $Y_3$ and $Y_4$ are —$OR_1$, i.e. the compound represented by formula (II),

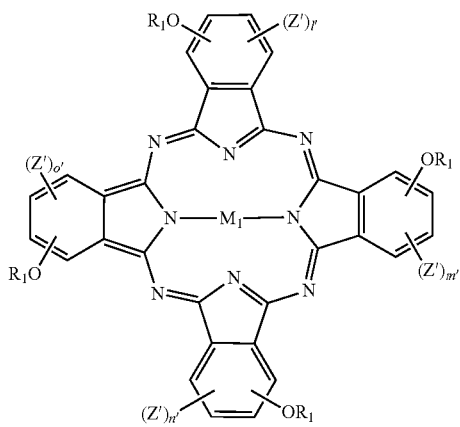
(II)

wherein
$M_1$ represents Cu (II) or Pd (II),
Z' is a group of the following formula:

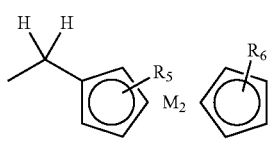

wherein $R_1$, $R_5$, $R_6$ and $M_2$ are the same as those defined in formula (I),
each l', m', n' and o' is independently 0, 1 or 2, and (l'+m'+n'+o') is between 1 and 4.

The particularly preferred embodiment of the present compound is the compound wherein $M_1$ is Cu(II), and —$OR_1$ is 2,4-dimethyl-3-pentoxyl, i.e. the compound represented by formula (III),

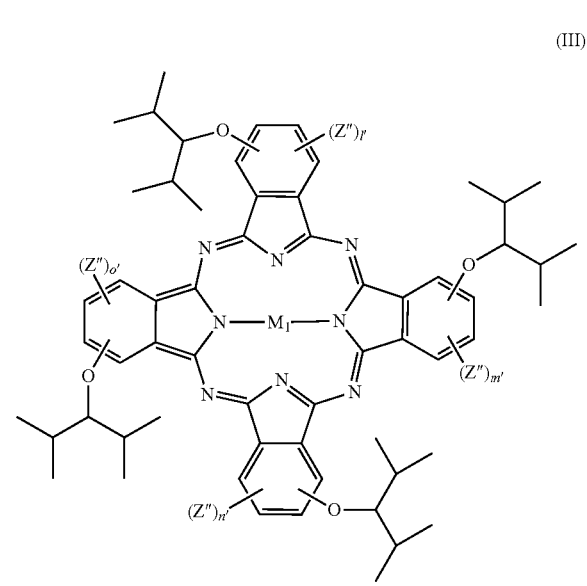
(III)

wherein Z" is a group of the following formula:

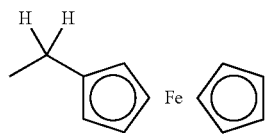

each l', m', n' and o' is independently 0, 1 or 2, and (l'+m'+n'+o') is between 1 and 4.

In the present invention, the metallocenyl phthalocyanines represented by formula (I) can exist in a mixture without isolation.

This invention also relates to a recording layer of an optical recording medium, which comprises the metallocenyl phthalocyanine single or in a mixture, of formula (I) and optionally another phthalocyanine/phthalocyanine mixture, such as the phthalocyanine represented by formula (IV),

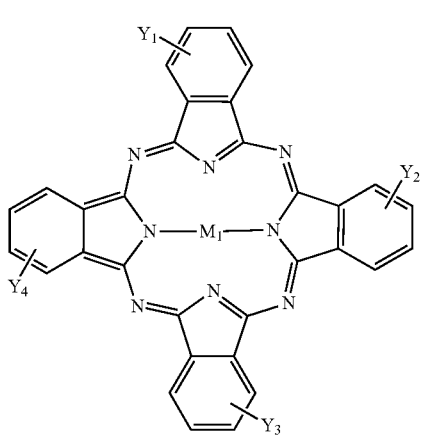
(IV)

wherein $M_1$, $Y_1$, $Y_2$, $Y_3$, and $Y_4$ are defined as the formula (I).

The recording layers comprise (a) 70-100% of the metallocenyl phthalocyanine or a mixture represented by formula (I); and (b) 0-30% of the other phthalocyanine or mixture represented by formula (IV), based on 100% by mass of the metallocenyl phthalocyanines represented by formula (I) and the other optional phthalocyanines represented by formula (IV).

In the recording layer of an optical recording medium of the present invention, the preferred embodiment of metallocenyl phthalocyanine compound is a compound represented by formula (II),

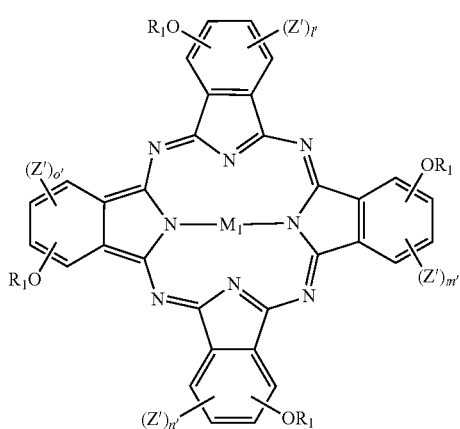

(II)

Z' is a group of the following formula:

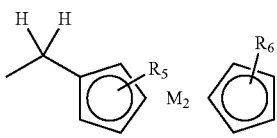

wherein $M_1$, $M_2$, $R_1$, $R_5$, $R_6$, l', m', n' and o' are defined as above.

In this case, the recording layers comprise (a) 70-100% of the metallocenyl phthalocyanine or a mixture represented by formula (II); and (b) 0-30% of the other phthalocyanine or mixture represented by formula (IV), based on 100% by mass of the metallocenyl phthalocyanines represented by formula (II) and the other optional phthalocyanines represented by formula (IV).

In the recording layer of an optical recording medium of the present invention, the particularly preferred embodiment of metallocenyl phthalocyanine compound is a compound represented by formula (III),

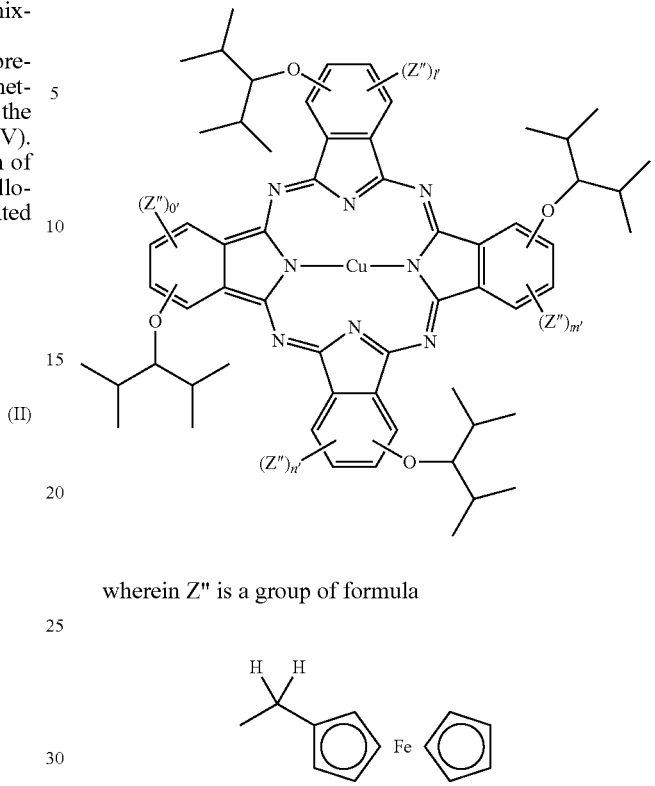

(III)

wherein Z" is a group of formula

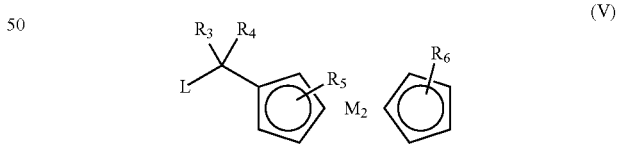

and l', m', n' and o' are defined as above.

In this case, the recording layers comprise (a) 70-100% of the metallocenyl phthalocyanine or a mixture represented by formula (III); and (b) 0-30% of the other phthalocyanine or mixture represented by formula (IV), based on 100% by mass of the metallocenyl phthalocyanines represented by formula (III) and the other optional phthalocyanines represented by formula (IV).

This invention also relates to a novel process for preparing the compound represented by formula (I), which comprises subjecting a metallocenyl complex and a phthalocyanine to a Friedel-Crafts reaction.

The metallocenyl complex used in the present process is represented by the formula (V).

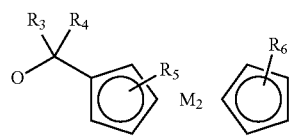

(V)

wherein L is a leaving group, for example, —Cl, —Br, —I, —OTs, —OMs, OTf, —OAc, —OPiv, —OBz, —OH, and the like; preferably —Cl, —Br, —I, —OTs, —OH; and $R_3$, $R_4$, $R_5$, $R_6$, $M_2$ are defined as in formula (I).

In the present process, the preferred metallocenyl complex is that represented by formula (VI),

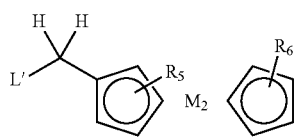

(VI)

wherein L' is a leaving group, for example, —Cl, —Br, —I, —OTs, —OH and the like; and $R_5$, $R_6$, $M_2$ are defined as in formula (I).

In the present process, the particularly preferred metallocenyl complex is that represented by formula (VII),

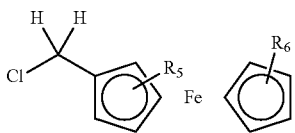

(VII)

wherein $R_5$ and $R_6$ are each a hydrogen atom or $C_1$-$C_4$ alkyl, preferably a hydrogen atom.

J. Am. Chem. Soc. 1966, 88, 3442-3444 has described that α-ferrocenyl carbonium ion exhibits α-carbocation stabilization. Thus the compound represented by formula (V) is easily shifted to form the following intermediate under an acidic catalysis, which intermediate is similar to the α-ferrocenyl carbonium ion:

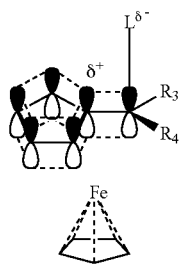

The process for preparing the metallocenyl phthalocyanines of the present invention comprises alkylating a phthalocyanine of the following formula (IV):

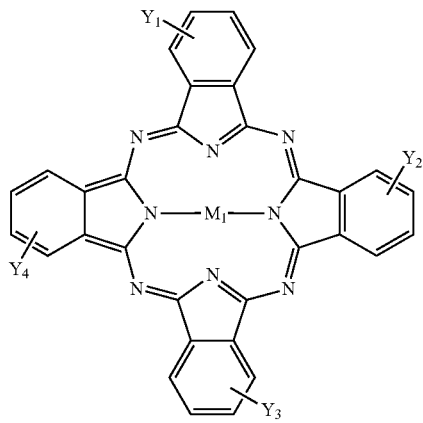

(IV)

wherein $M_1$, $Y_1$, $Y_2$, $Y_3$, $Y_4$ are defined as above, with a metallocene compound of formula (V) in the presence of an acidic catalyst:

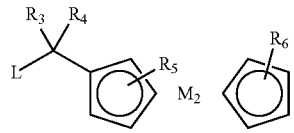

(V)

wherein $R_3$, $R_4$, $R_5$, $R_6$, $M_2$, and L are defined as above, to afford the present metallocenyl phthalocyanine.

In the above reaction, the metallocene compound of formula (V) first forms an acidic ion pair consisting of an α-ferrocenyl carbonium ion and the L anion, and then it is reacted and bonded with the phthalocyanine of formula (IV) through a group containing one carbon in suitable reaction conditions to form the present metallocenyl phthalocyanine.

The ratio of metallocene (formula (V)) to phthalocyanine (formula (IV)) for the alkylation reaction is between 8:1 and 0.5:1, preferably between 4:1 and 1:1.

The reaction is conducted in aprotic solvents, for example, dichloromethane, dichloroethane, chloroform, chlorobenzene, toluene, xylene, acetonitrile, trimethylbenzene, tetrahydrofuran, or ethylene glycol dimethyl ether, and the like. The mass ratio of solvents and phthalocyanine (IV) is between 2:1 and 40:1, preferably between 6:1 and 12:1.

The reaction is facilitated by acidic catalysts, for example, inorganic acids or organic acids. The inorganic acids can be, for example, $H_2SO_4$, $HClO_4$, $H_3PO_4$, HCl, HBr and the like. The organic acids can be, for example, toluenesulfonic acid, benzenesulfonic acid, trifluoromethanesulfonic acid, trifluoroacetic acid and the like. The Lewis acids can be, for example, $AlCl_3$, $ZnCl_2$, $BF_3$ and the like.

The amounts of the catalyst depend on the property of the catalyst, and the molar ratio of the catalyst to the phthalocyanine (IV) is from 0.1 to 2.0, preferably from 0.2 to 1.0.

The reaction temperature depends on the solvent and catalyst, and the temperature is generally from 20 to 120° C., preferably from 50 to 90° C.

The duration of reaction depends on the reaction temperature, solvent used and amounts of catalyst. It is generally from 2 to 24 h, preferably from 12 to 16 h.

Metallocenyl phthalocyanine of formula (II) can be synthesized from compound (VIII) and compound (VI) by the Friedel-Crafts reaction in the presence of an acidic catalyst.

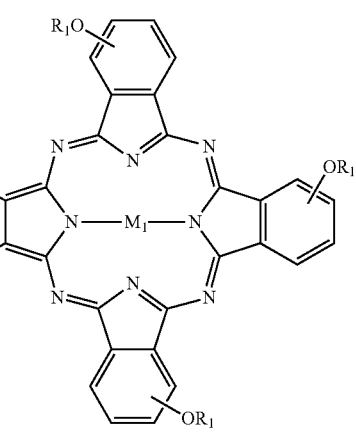

(VIII)

$M_1$ and $R_1$ are defined the same as in formula (II).

The metallocenyl phthalocyanine of the present invention is prepared on connecting metallocene (formula (V)) and phthalocyanine (formula (IV)) through a linker having one carbon atom under the acid catalyst. The novel synthetic strategy involves a linker having one carbon atom, and a short route for the synthesis. The present metallocenyl phthalocyanines exhibit an excellent sensitivity and excellent optical recording properties when they are used in the recording layers of optical recording media.

In the present invention, the recording layer containing the present metallocenyl phthalocyanines and/or mixtures thereof shows λmax at 690 nm~780 nm. As the recording layer is generally applied from a solution, for example by spin coating, the dyes should be readily soluble in customary solvents, for example as described in EP-A 511 598 (independently of the distinction between polar and non-polar solvents made therein).

Examples of coating methods for optical recoding media are spin coating, sputtering deposition, vapor deposition and dip coating; among them, spin coating is preferable because of the ease of control of the film thickness of the land/groove of the recording layer. For the spin coating, a preferable solvent is one that is unreactive with the substrate.

The advantages of the present invention are: (1) metallocenyl phthalocyanines and their derivatives have improved solubility in solvents of low polarity, thus avoiding use of highly polar volatile solvents, such as acetone, dichloroethane and dimethylforamide. In addition, the solvents should be chosen from non-polar solvents that do not damage the substrate, for example, selected from alicyclic hydrocarbons such as cyclohexane, methylcyclohexane, dimethylcyclohexane, isopropylcyclohexane, cyclooctane; ethers such as diethylether, dipropylether, diisopropylether, di-n-butylether, di-iso-butylether, di-n-pentylether; alcohols such as isopropanol, isobutanol, or cyclopentanol.

Furthermore, other cosolvents may be used in preparing the solution containing the present metallocenyl phthalocyanines, for example, toluene, xylene, trimethylbenzene, methyl isobutyl ketone, diisobutylketone or 2,6-dimethyl-4-heptanone and the like.

Some solvents have been suggested for use in preparing the recording layers, for example, DBE (di-n-butylether), ECH (ethylcyclohexane) or DMCH (dimethylcyclohexane). The suggested cosolvent is 1,2,4-trimethylbenzene. Conventionally, in preparing the solution for coating the recording layer, the phthalocyanines are typically in a concentration 2-3% (mass/v). However, the present metallocenyl phthalocyanines and/or derivatives thereof can be used in a concentration more than 6% (mass/v) because of their excellent solubility in the selected solvents.

The invention is further described in the following examples. It should be understood that these examples are for illustrative purposes only and are not to be construed as limiting this invention in any manner.

EXAMPLES

Example 1

Tetra-(α-2,4-dimethyl-3-pentyloxy)copper phthalocyanine (CuPc, 30.0 g) was dissolved in 1,2-dichloroethane (300 mL) and stirred for 0.5 h in a dry flask. Chloromethylferrocene (FcCH$_2$Cl, 12.2 g) (FcCH$_2$Cl was prepared by the known method described in J. Am. Chem. Soc. 1966, 88, 3442-3444) was added, and subsequently aluminium chloride (1.56 g) was crushed and added promptly. The mixture was stirred for 10 min, warmed up to 80° C. for another 4 h and then cooled to room temperature.

The mixture aforementioned was poured into a solution mixed with ice (180 g) and water (180 mL) in a beaker (1 L), and stirred; the temperature was controlled about 10° C. for 1 h. The solution was poured into a separatory funnel and extracted with water (300 mL) twice. The organic layers were collected, concentrated to approximately 70 g, and poured into a methanol (900 mL) solution with stirring by a mechanical agitator at a temperature about 10° C. The precipitate was formed and filtered. The filtered cake was washed with methanol (30 mL) three times to give a green residue. The green residue was purified on a chromatographic column (silica gel 60H, Merck, toluene:hexanes=1:4) to give a blue-green solid of a mixture (substance 1) (21.5 g).

The mixture (substance 1) has the following properties:
FAB MS (m/z): 1230(CuPc-CH$_2$Fc), 1428(CuPc-(CH$_2$Fc)$_2$), 1626(CuPc-(CH$_2$Fc)$_3$)
UV/VIS: λ max=718 nm (NMP), εmax=1.79×10$^5$ mL/g·cm
IR (KBr): 3091, 2961, 2873, 1587, 1486, 1335, 1266, 1089, 1038, 746 cm$^{-1}$.

Example 2

Tetra-(α-2,4-dimethyl-3-pentyloxy)copper phthalocyanine (CuPc, 30.0 g) was dissolved in 1,2-dichloroethane (300 mL) and stirred for 0.5 h in a dry flask. Chloromethylferrocene (FcCH$_2$Cl, 12.2 g) was added, and then sulfuric acid (98%, 0.86 g) was slowly added. The mixture was stirred for 10 min, warmed to 90° C. for another 3 h, and then cooled to room temperature.

The solution aforementioned was poured into a beaker equipped with a magnetic stirrer, and charged with a mixture of ice (60 g) and water (300 mL). The mixture was stirred and the temperature was controlled at 10~15° C. for 0.5 h. The solution was poured into a separatory funnel, and extracted with water (300 mL) twice. The organic layers were collected, concentrated to approximately 70 g, and poured into a methanol (900 mL) solution with stirring by a mechanical agitator at a temperature about 10° C. A precipitate was formed and filtered. The filtered cake was washed with methanol (30 mL) three times to give a green residue. The green residue was purified on a chromatographic column (silica gel 60H, Merck, toluene:hexanes=1:4) to give a blue-green solid of a mixture (19.7 g).

The mixture has the following properties:
FAB MS (m/z): 1230(CuPc-CH$_2$Fc), 1428(CuPc-(CH$_2$Fc)$_2$), 1626(CuPc-(CH$_2$Fc)$_3$)
UV/VIS: λ max=719 nm (NMP), εmax=1.68×10$^5$ mL/g·cm
IR (KBr): 3092, 2963, 2872, 1586, 1485, 1335, 1266, 1087, 1038, 745 cm$^{-1}$.

Example 3

Tetra-(α-2,4-dimethyl-3-pentyloxy)copper phthalocyanine (CuPc, 30.0 g) was dissolved in 1,2-dichloroethane (300 mL) in a dry flask and stirred for 0.5 h. Chloromethylferrocene (FcCH$_2$Cl, 12.2 g) was added, and subsequently aluminium chloride (2.33 g) was crushed and added promptly. The mixture was stirred for 10 min, warmed to 80° C. for another 6 h and then cooled to room temperature.

The solution aforementioned was poured into a beaker equipped with a magnetic stirrer, and charged with a mixture of ice (180 g) and water (180 mL). The mixture was stirred, and the temperature was controlled at 10° C. for 1 h. The solution was poured into a separatory funnel, and extracted with water (300 mL) twice. The organic layers were collected, concentrated to approximately 100 g, and poured into a methanol (900 mL) solution with stirring by a mechanical agitator with the temperature controlled at 10° C. A precipitate was formed and filtered. The filtered cake was washed with methanol (30 mL) three times to give a green residue. The green residue was purified on a chromatograph column (silica gel 60H, Merck, toluene:hexanes=1:4) to give a blue-green solid of a mixture (substance 2) (24.9 g).

The mixture (substance 2) has the following properties:
FAB MS (m/z): 1230(CuPc-$CH_2$Fc), 1428(CuPc-($CH_2$Fc)$_2$), 1626(CuPc-($CH_2$Fc)$_3$), 1824(CuPc-($CH_2$Fc)$_4$), 2022(CuPc-($CH_2$Fc)$_5$).
UV/VIS: $\lambda$ max=722 nm (NMP), $\epsilon$max=1.57×10$^5$ mL/g·cm
IR (KBr): 3091, 2961, 2873, 1588, 1485, 1335, 1266, 1087, 1038, 745 cm$^{-1}$.

Example 4

Tetra-($\alpha$-2,4-dimethyl-3-pentyloxy)copper phthalocyanine (CuPc, 30.0 g) was dissolved in toluene (240 mL) and stirred for 0.5 h in a dry flask. Chloromethylferrocene (FcCH$_2$Cl, 12.2 g) was added, and subsequently aluminium chloride (1.56 g) was crushed and added promptly. The mixture was stirred for 10 min, warmed to 70° C. for another 5 h and then cooled to room temperature.

The solution aforementioned was poured into a beaker equipped with a magnetic stirrer, and charged with a mixture of ice (120 g) and water (240 mL). The mixture was stirred and the temperature was controlled at 10° C. for 1 h. The solution was poured into a separatory funnel, and extracted with water (300 mL) twice. The organic layers were collected, concentrated to approximately 80 g, and poured into a methanol (1000 mL) solution with stirring with a mechanical agitator and at a controlled temperature 10° C. A precipitate was formed and filtered. The filtered cake was washed with methanol (30 mL) three times to give a green residue. The green residue was purified on a chromatographic column (silica gel 60H, Merck, toluene:hexanes=1:4) to give a blue-green solid of a mixture (substance 3) (18.5 g).

The mixture (substance 3) has the following properties:
FAB MS (m/z): 1230(CuPc-$CH_2$Fc), 1428(CuPc-($CH_2$Fc)$_2$), 1626(CuPc-($CH_2$Fc)$_3$), 1824(CuPc-($CH_2$Fc)$_4$).
UV/VIS: $\lambda$ max=719 nm (NMP), $\epsilon$max=1.72×10$^5$ mL/g·cm
IR (KBr): 3091, 2963, 2872, 1587, 1486, 1335, 1266, 1088, 1038, 747 cm$^{-1}$.

Example 5

Tetra-($\alpha$-2,4-dimethyl-3-pentyloxy)copper phthalocyanine (CuPc, 30.0 g) was dissolved in 1,2-dichloroethane (300 mL) in a dry flask and stirred for 0.5 h. Ferrocenemethanol (FcCH$_2$OH, 12.6 g) was added and then trifluoromethanesulfonic anhydrous (11.1 g) was slowly added. The mixture was stirred for 30 min. Subsequently, 98% sulfuric acid (1.71 g) was added and stirred for 10 min at room temperature. The mixture was warmed to 90° C. for another 3 h and then cooled to room temperature.

The solution aforementioned was poured into a beaker equipped with a magnetic stirrer, and charged with a mixture of ice (60 g) and water (300 mL). The mixture was stirred and the temperature was controlled at 10~15° C. for 0.5 h. The solution was poured into a separatory funnel, and extracted with water (300 mL) twice. The organic layers were collected, concentrated to approximately 70 g, and poured into a methanol (900 mL) solution with stirring by a mechanical agitator and with the temperature controlled at 10° C. A precipitate was formed and filtered. The filtered cake was washed with methanol (30 mL) three times to give a green residue. The green residue was purified on a chromatographic column (silica gel 60H, Merck, toluene:hexanes=1:4) to give a blue-green solid of a mixture (19.7 g).

The mixture has the following properties:
FAB, MS (m/z): 1230(CuPc-$CH_2$Fc), 1428(CuPc-($CH_2$Fc)$_2$), 1626(CuPc-($CH_2$Fc)$_3$).
UV/VIS: $\lambda$ max=717 nm (NMP), $\epsilon$max=1.73×10$^5$ mL/g·cm.
IR (KBr): 3091, 2962, 2873, 1586, 1485, 1335, 1266, 1087, 1037, 744 cm$^{-1}$.

Example 6

Tetra-($\alpha$-2,4-dimethyl-3-pentyloxy) copper phthalocyanine (CuPc, 30.0 g) was dissolved in 1,2-dichloroethane (300 mL) in a dry flask and stirred for 0.5 h. 1-Ferrocenylethyl acetate (FcCH(CH$_3$)OAc, 15.8 g) was added and subsequently aluminium chloride (1.94 g) was crushed and added promptly. The mixture was stirred for 10 min, warmed to 80° C. for another 12 h and then cooled to room temperature.

The solution aforementioned was poured into a beaker equipped with a magnetic stirrer, and charged with a mixture of ice (180 g) and water (180 mL). The mixture was stirred with the temperature controlled at 10~15° C. for 1 h. The solution was poured into a separatory funnel, and extracted with water (300 mL) twice. The organic layers were collected, concentrated to approximately 80 g, and poured into a methanol (900 mL) solution with stirring by a mechanical agitator and the temperature controlled at 10° C. A precipitate was formed and filtered. The filtered cake was washed with methanol (30 mL) three times to give a green residue. The green residue was purified on a chromatographic column (silica gel 60H, Merck, toluene:hexanes=1:5) to give a blue-green solid of a mixture (3.1 g).

The mixture has the following properties:
FAB MS (m/z): 1244(CuPc-$CH_2$(CH$_3$)Fc), 1456(CuPc-(CH$_2$(CH$_3$)Fc)$_2$).
UV/VIS: $\lambda$ max=719 nm (NMP), $\epsilon$max=1.92×10$^5$ mL/g·cm
IR (KBr): 3086, 2960, 2924, 2870, 2855, 1584, 1488, 1337, 1265, 817 cm$^{-1}$.

Example 7

Tetra-($\alpha$-2,4-dimethyl-3-pentyloxy)copper phthalocyanine (CuPc, 30.0 g) was dissolved in toluene (300 mL) in a dry flask and stirred for 0.5 h. 1-Ferrocenylethyl acetate (FcCH(CH$_3$)OAc, 15.8 g) was added, and subsequently aluminium chloride (1.94 g) was crushed and added promptly. The mixture was stirred for 10 min, warmed to 100° C. for another 8 h and then cooled to room temperature.

The solution aforementioned was poured into a beaker equipped with a magnetic stirrer, and charged with a mixture of ice (180 g) and water (180 mL). The mixture was stirred with the temperature controlled at 10~15° C. for 1 h. The solution was poured into a separatory funnel, and extracted with water (300 mL) twice. The organic layers were collected, concentrated to approximately 80 g, and poured into a methanol (1 L) solution with stirring by a mechanical agitator and the temperature controlled at 10° C. A precipitate was formed and filtered. The filtered cake was washed with methanol (30 mL) three times to give a green residue. The green residue was purified on a chromatographic column (silica gel 60H, Merck, toluene:hexanes=1:5) to give a blue-green solid of a mixture (2.6 g).

The mixture has the following properties

FAB MS (m/z): 1244 (CuPc-$CH_2(CH_3)$Fc), 1456 (CuPc-$(CH_2(CH_3)Fc)_2$).

UV/VIS: $\lambda$ max=719 nm (NMP), $\epsilon$max=1.85×10$^5$ mL/g·cm.

IR (KBr): 3086, 2961, 2924, 2870, 2855, 1585, 1488, 1338, 1265, 816 cm$^{-1}$.

Example 8

Tetra-($\alpha$-2,4-dimethyl-3-pentyloxy)palladium phthalocyanine (PdPc, 100.0 g) was dissolved in 1 L of 1,2-dichloroethane in a dry flask and stirred for 0.5 h. Chloromethylferrocene ($FcCH_2Cl$, 44 g) was added and subsequently aluminium chloride (7.5 g) was crushed and added promptly. The mixture was stirred for 10 min, warmed to 80° C. for another 8 h and then cooled to room temperature.

The mixture aforementioned was poured into a mixture of ice (400 g) and water (800 mL) at 10° C. The solution was stirred for 1 h, poured into a separatory funnel and extracted with water (800 mL) twice. The organic layers were collected, concentrated to approximately 200 g, and poured into a methanol (2.4 L) solution with stirring by a mechanical agitator and the temperature controlled at 10° C. A precipitate was formed and filtered. The filtered cake was washed with methanol (120 mL) three times to give a green residue. The green residue was purified on a chromatographic column (silica gel 60H, Merck, toluene:hexanes=1:6) to give a blue-green solid of a mixture (substance 4) (84 g).

The mixture (substance 4) has the following properties:

FAB MS (m/z): 1272(PdPc-$CH_2Fc$), 1470(PdPc-$(CH_2Fc)_2$), 1668(PdPc-$(CH_2Fc)_3$).

UV/VIS: $\lambda$ max=712 nm (NMP), $\epsilon$max=1.54×10$^5$ mL/g·cm.

IR (KBr): 3090, 2962, 2874, 1598, 1499, 1325, 1264, 1107, 1042, 817, 746 cm$^{-1}$.

Example 9

Tetra-($\alpha$-2,4-dimethyl-3-pentyloxy)palladium phthalocyanine (PdPc, 20.0 g) was dissolved in 1,2-dichloroethane (200 mL) in a dry flask and stirred for 0.5 h. Chloromethylferrocene ($FcCH_2Cl$, 21.8 g) was added, and subsequently aluminium chloride (1.5 g) was crushed and added promptly. The mixture was stirred for 10 min, warmed to 80° C. for another 8 h and then cooled to room temperature.

The mixture aforementioned was poured into a mixture of ice (100 g) and water (200 mL) at a temperature 10° C. The solution was stirred for 1 h, poured into a separatory funnel and extracted with water (200 mL) twice. The organic layers were collected, concentrated to approximately 60 g, and poured into a methanol (500 mL) solution with stirring by a mechanical agitator and the temperature controlled at 10° C. A precipitate was formed and filtered. The filtered cake was washed with methanol (30 mL) three times to give a green residue. The green residue was purified on a chromatographic column (silica gel 60H, Merck, toluene:hexanes=1:6) to give a green solid of a mixture (substance 5) (17.6 g).

The mixture (substance 5) has the following properties:

FAB MS (m/z): 1272(PdPc-$CH_2Fc$), 1470(PdPc-$(CH_2Fc)_2$), 1668(PdPc-$(CH_2Fc)_3$), 1866(PdPc-$(CH_2Fc)_4$.

UV/VIS: $\lambda$ max=716 nm (NMP), $\epsilon$max=1.47×10$^5$ mL/g·cm.

IR (KBr): 3093, 2961, 2873, 1599, 1499, 1326, 1265, 1107, 1042, 812, 749 cm$^{-1}$.

Example 10

CD-R Test

A solution of substance 1 (2.85 g) prepared as described in Example 1 in a mixture of DBE (Di-butyl ether) and 1,2,4-trimethyl benzene (94:3 by mass) that was filtered through a 0.1 μm filter (Teflon), was applied by spin coating onto a polycarbonate substrate (thickness 1.18 mm, diameter 120 mm) with grooves 200 nm deep and 650 nm half width height with a distance 1.6 μm between two grooves. The disc was coated at a speed of rotation 350 rpm for 5 s then at 3000 rpm for 10 s. The excess of solution was spun off on increasing the speed of rotation. All disks tested meet the specification in "*Orange Book Part III: CD-RW, Volume* 1, *Version* 2.0". The absorption spectrum was measured over the visible spectrum by means of a spectrophotometer, and the wavelength of the maximum absorbance was determined to be 0.52 μm. The uniformly applied layer was then dried at 80° C. in a convection oven for 20 min. A silver layer (thickness 70 nm) was subsequently deposited on the resulting recording layer in a vacuum-coating apparatus (Swivel, Balzers Co.). A protective layer (thickness 5 μm) of a UV-curing photopolymer (SD-394, manufactured by Dainippon Ink and Chemicals Incorporated (DIC)) was then applied thereto by spin coating and cured by irradiation with UV light (UVM-201 manufactured by Heng Ji Industrial Co., Taiwan) to form a protective layer. The disk produced in this way was tested by means of commercial recorders (LTR-52327S, manufactured by Lite-on It Corporation, 5232X manufactured by BenQ Corporation, and PX-W5224TA manufactured by Plextor Co.) at a writing speed 48×. The measured results are shown in Table 1 below.

TABLE 1

| | Recorder Type | | | | | |
|---|---|---|---|---|---|---|
| | LTR-52327S | | 5232X Highest Speed | | PX-W5224TA | |
| | 48X | | 48X | | 48X | |
| | Signal Length | | | | | |
| | 3T | 11T | 3T | 11T | 3T | 11T |
| Pit Jitter | 25 | 26 | 26 | 27 | 26 | 28 |
| Land Jitter | 28 | 29 | 26 | 28 | 27 | 26 |
| Blur | 0.3 | | 0.1 | | 0.5 | |

Example 11

CD-R Test

Similar to example 10, 2.90 g of substance 2 prepared as described in Example 3 was used instead of substance 1. The measured results are shown in Table 2 below.

TABLE 2

| | Recorder Type | | | | | |
|---|---|---|---|---|---|---|
| | LTR-52327S | | 5232X Highest Speed | | PX-W5224TA | |
| | 48X | | 48X | | 48X | |
| | Signal Length | | | | | |
| | 3T | 11T | 3T | 11T | 3T | 11T |
| Pit Jitter | 26 | 28 | 25 | 28 | 28 | 27 |
| Land Jitter | 25 | 28 | 28 | 27 | 26 | 27 |
| Blur | 0.5 | | 0.4 | | 0.2 | |

Example 12

CD-R Test

Similar to example 10, substance 4 (2.94 g) prepared as described in Example 8 was used instead of substance 1. The measured results are shown in Table 3 below.

TABLE 3

| Recorder Type | | | | | |
|---|---|---|---|---|---|
| LTR-52327S | | 5232X | | PX-W5224TA | |
| Highest Speed | | | | | |
| 48X | | 48X | | 48X | |
| Signal Length | | | | | |
| 3T | 11T | 3T | 11T | 3T | 11T |
| Pit Jitter 27 | 27 | 26 | 27 | 26 | 29 |
| Land Jitter 26 | 28 | 27 | 28 | 28 | 28 |
| Blur | 0.5 | | 0.4 | | 0.2 |

It is to be understood that, although the invention has been described in conjunction with the detailed description thereof, the foregoing description is intended to be illustrative and not to limit the scope of the invention, which is defined by the scope of the appended claims. Other aspects, advantages and modifications are within the scope of the following claims.

What is claimed is:

1. A process for the preparation of a metallocenyl phthalocyanine compound represented by formula (II):

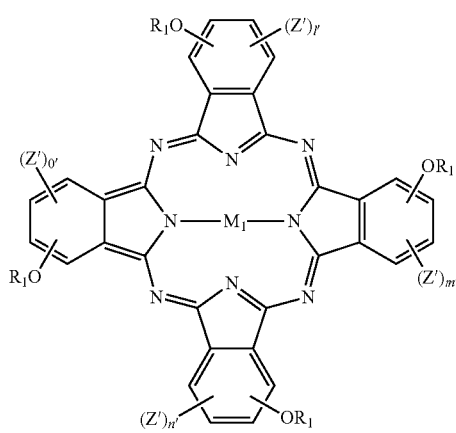

(II)

wherein $M_1$ represents Cu(II) or Pd(II);

$R_1$ represents a hydrogen atom, a $C_1$-$C_{10}$ straight-chain, branched, or $C_3$-$C_{10}$ cyclic alkyl; $C_2$-$C_{10}$ straight-chain, branched, or a $C_3$-$C_{10}$ cyclic alkenyl; or a $C_2$-$C_{10}$ straight-chain, branched, or $C_3$-$C_{10}$ cyclic alkynyl;

Z' represents a group of formula

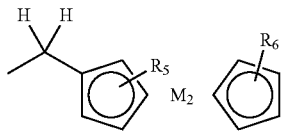

in which $R_5$ and $R_6$ each independently represents a hydrogen atom, a halogen atom, a nitro group, a $C_1$-$C_4$ alkyl, a $C_1$-$C_4$ alkoxy, a $C_1$-$C_4$ alkylamino, a di($C_1$-$C_4$alkyl)amino or a diarylphosphine group in which the aryl group is unsubstituted or substituted; and $M_2$ is selected from an atom consisting of Fe(II), Co(II), and Ni(II);

wherein l', m', n', o' each independently represents 0, 1 or 2, and (l'+m'+n'+o') is between 1 and 4, the process comprising the reacting of a compound of formula (VIII) and a compound of formula (VI) via a Friedel-Crafts reaction in aprotic solvents and in the presence of an acidic catalyst at a temperature between 20 and 120° C.:

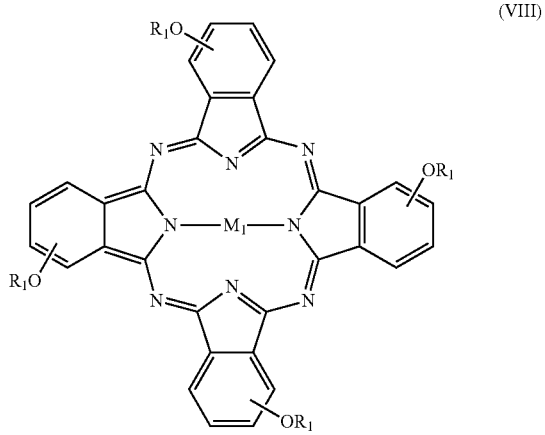

(VIII)

wherein, $M_1$ represents Cu(II) or Pd(II);

$R_1$ represents a hydrogen atom; a $C_1$-$C_{10}$ straight-chain, branched, or $C_3$-$C_{10}$ cyclic alkyl; $C_2$-$C_{10}$ straight-chain, branched, or a $C_3$-$C_{10}$ cyclic alkenyl; or a $C_2$-$C_{10}$ straight-chain, branched, or $C_3$-$C_{10}$ cyclic alkynyl;

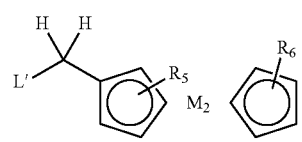

(VI)

wherein L' is a leaving group; $R_5$ and $R_6$ each independently represents a hydrogen atom, a halogen atom, a nitro group, a $C_1$-$C_4$ alkyl, a $C_1$-$C_4$ alkoxy, a $C_1$-$C_4$ alkylamino, a di($C_1$-$C_4$alkyl)amino, or a diarylphosphine group in which the aryl is unsubstituted or substituted; and $M_2$ is selected from an atom consisting of Fe(II), Co(II), and Ni(II).

* * * * *